July 14, 1931.  O. F. LUNDELIUS ET AL  1,814,256
VEHICLE CHASSIS
Filed Jan. 9, 1929   2 Sheets-Sheet 1
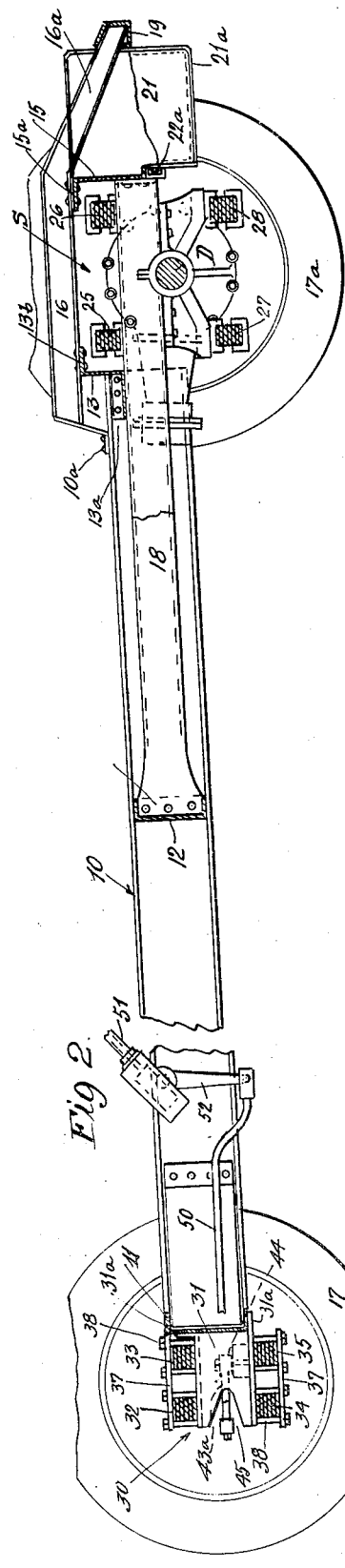
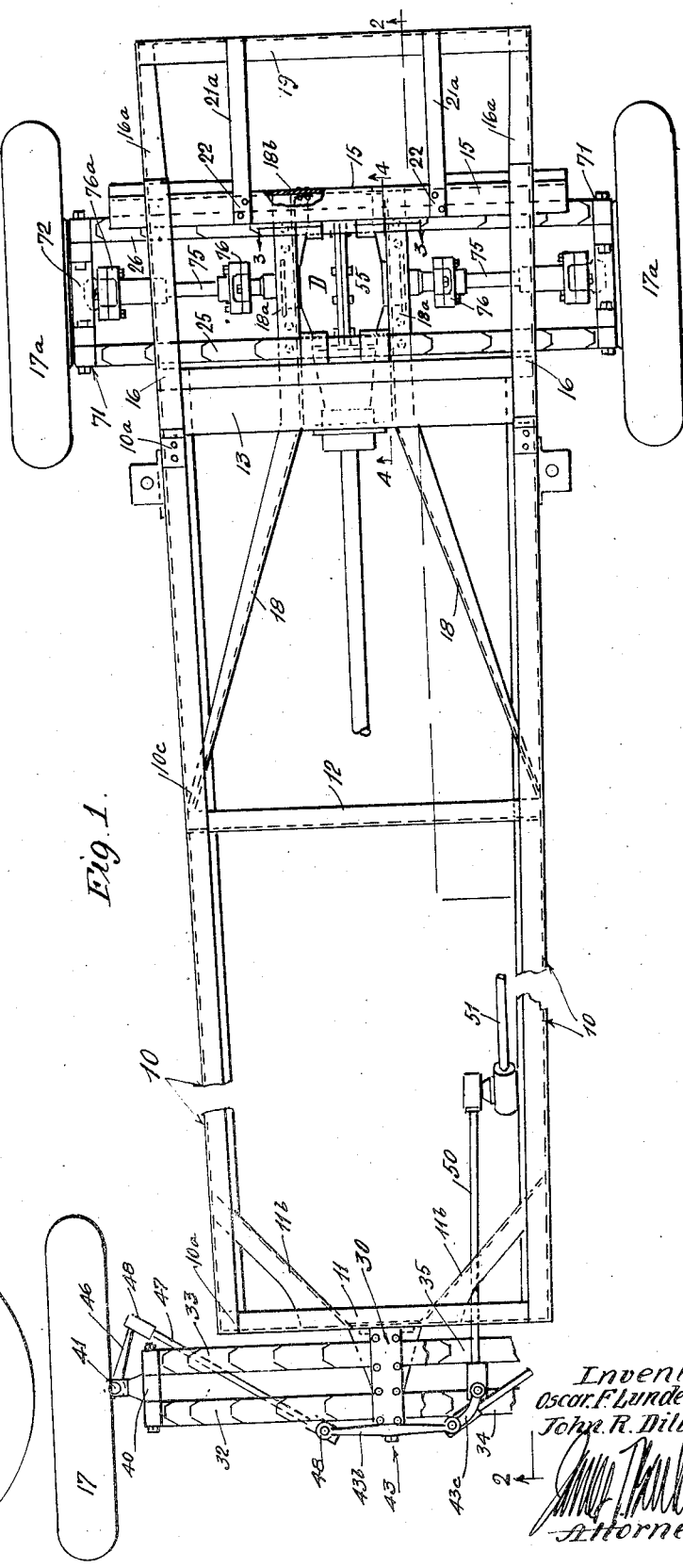
Inventors
Oscar F. Lundelius
John R. Dillon
Attorney.

Patented July 14, 1931

1,814,256

UNITED STATES PATENT OFFICE

OSCAR F. LUNDELIUS AND JOHN R. DILLON, OF LOS ANGELES, CALIFORNIA, ASSIGNORS TO LUNDELIUS & ECCLESTON MOTORS CORPORATION, OF LAS VEGAS, NEVADA, A CORPORATION OF DELAWARE

VEHICLE CHASSIS

Application filed January 9, 1929. Serial No. 331,229.

Our invention relates broadly to vehicle chassis, and has to do particularly with chassis construction for motor vehicles in which the body, frame, and other parts are mounted on the wheels directly through spring suspension systems instead of in the usual manner by way of springs attached to laterally extending axles.

It may be stated preliminarily, that the primary purpose of adopting the present type of vehicle construction is to reduce unsprung weight to a minimum, thus giving stability to the vehicle body when the wheels pass over rough roads, and in addition, to reduce destructive wear on parts due to impact or shock. In the present type of spring supported vehicles, certain departures from usual chassis construction are made in order to provide for mounting the individual spring suspensions, differential, steering gear, and other mechanical parts, in a manner such that the wheels and their supporting springs may have free movement independent of other parts of the chassis that may be considered relatively stationary. For instance, the differential, instead of being integral with a rear axle housing as in the usual chassis, is carried directly on the frame, and the drive imparted from the differential to the wheels through shafts having universal joint connections with the differential and the wheel shafts. Again, the spring suspension system and steering gear, because of their adaptability to this type of vehicle, differ from the usual spring systems and steering gear both with regard to structure and their mounting on the frame.

Although the invention embodies certain features in the construction of the frame itself, it is concerned further and more particularly with the differential and rear spring suspension mounting, and also with the supporting structure for the forward suspension system and steering gear. For the purpose of showing a typical embodiment of the invention, we have illustrated and will describe the chassis as equipped with spring suspension systems and steering gear of the general nature disclosed in our copending application on steering gear, Ser. No. 331,228, and filed on even date herewith. However, it will be understood that the invention is not to be considered as limited to the use of the particular spring arrangement and steering gear construction shown, for various modifications of the present preferred arrangement of these parts may be made without departure from the scope of the invention.

The invention will be understood most readily from the following detailed description of an embodiment thereof, reference being made throughout the description to the accompanying drawings, in which:

Figure 1 is a plan view of the chassis in which certain parts having no bearing on the invention are omitted;

Fig. 2 is a sectional elevation on line 2—2 of Fig. 1;

Fig. 3 is a section on line 3—3 of Fig. 1 certain spring mountings being shown in section to illustrate the block and pad construction; and Fig. 4 is a section on line 4—4 of Fig. 1.

In Figs. 1 and 2, the vehicle frame is seen to embody side channel rails 10, the forward end rail 11, and intermediate cross rails 12 and 13. As shown in Fig. 4, cross rail 13 is joined to the side rails by riveting its upturned bottom flange 13a to the side rail. The vertically offset rails 16, commonly termed kick-up sills, are joined to the side rails at 10a, and continue in vertical alinement therewith to the rear of the chassis. The sills 16 extend horizontally a suitable distance and continue in the downwardly inclined portions 16a, these being connected at their extremities by cross member 19. Another cross rail 15 interconnects the kick-up sills, the upper flange 15a of the rail being riveted to the lower flanges of the sills. The upper flange 13b of rail 13 is also riveted to the sills. Thus by offsetting the sills above the side rails 10, there is provided a space S in which the rear spring suspension system and the differential are mounted between cross rails 13 and 15, as will be described.

The frame also embodies a pair of channel sub rails 18, these rails being joined to the side rails at a longitudinal intermediate point 10c thereon and converging rearwardly to cross rail 13, the sub rails being riveted to flange 13a of the cross rail as clearly shown in Fig. 4. The sub rails then continue in parallel, and with predetermined lateral spacing, to cross rail 15, the central webs of the sub rails being joined thereto as at 18b. The present rear frame construction affords a convenient means for mounting the gasoline tank 21, which is held in place by the surrounding strips 21a joined to rails 15 at 22, and to the lower flange of this rail at 22a. It will suffice to note at this point that the differential D and springs 25, 26, 27 and 28, comprising the rear suspension unit, are mounted on the sub rails at their parallel extents 18a between rails 13 and 15, the details of this construction being described later.

Mounted centrally on the forward end of the chassis is the forward spring suspension and steering gear support generally indicated at 30. This arrangement is shown and described in detail in the previously mentioned copending application on steering gear, but will be briefly described in the present application as a preferred form of this particular portion of the chassis. The mounting 30 embodies a horizontally extending bracket or box 31 joined to rail 11 at 31a, the symmetrically arranged springs 32, 33, 34 and 35 being clamped on the vertically opposing sides of the box by means of plates 37, and these in turn being brought to bear against the springs by means of bolts 38 extending into the box. It will be noted that the frame is provided with the diagonal braces 11b, the purpose of these braces being to relieve the forward end rail 11 and the corner joints 10a against both horizontal and vertical stresses and strains arising from front wheel impact or shock imparted to the frame member 11 through the forward supporting structure 30. It is to be understood that the forward support 30 is not limited to the use of the box or bracket shown, and that this construction may be varied in numerous ways, for instance as illustrated in our copending application on spring mounting, Ser. No. 331,230, and filed on even date herewith, in which the steering gear and springs are supported by means of a pair of arms, instead of the illustrated box structure.

The steering gear is designed particularly to permit the spring flexure inherent in systems of this nature, without transmittal of shocks to the vehicle operator, or destructive forces or impacts on the gear. It may be noted that the support 31 serves as a mounting for both the forward spring suspension system and parts of the steering gear, and in a manner such as to enable certain parts of the gear to move in accordance with the wheel movement in all directions for the purposes hereinafter mentioned.

The springs comprising the front suspension system are terminally joined to the vertical wheel carrier plates 40, these in turn pivotally carrying the usual steering knuckles (not shown) the point of connection between these parts being indicated by the pivot pin 41. The manner in which the front and rear wheels 17, 17a, are mounted on their respective wheel carriers, and the construction of numerous associated parts, is fully described in our copending application on spring mounting, Ser. No. 154,382, filed Dec. 13, 1926. Mounted in the box 31 is a horizontal T-shaped steering arm generally indicated at 43. The steering arm is comprised of the central arm 43a pivotally mounted in the box at 44, and the front arm 43b which is secured at its center to the outer end of arm 43a. Thus it is seen that the T-shaped arm is capable of horizontal swinging movement about its pivotal mounting 44 in the box, the sides thereof being cut away as at 45 to permit this swinging movement. Arm 43b is connected to the steering knuckle arms 46 by means of tie rods 47, ball and socket joints 48 between these parts being used to permit relative vertical movement between the steering knuckle arms and the steering arm, as well as horizontal turning movement. Arm 43b is provided at one end with an arcuate extension 43c to which drag link 50 is connected, the drag link being actuated from the steering wheel shaft 51 by way of arm 52 in the usual manner. It will be seen that with this type of steering gear, in which there is an individual tie rod for controlling each wheel through its steering knuckle, the wheels are controlled individually and, in addition, the tie rods are free to move universally at their points of connection with the actuating steering arm 43 to describe substantially the same arcs followed by their points of connection with the steering knuckle arms upon vertical displacement of the wheels, and without play or binding in the joints. Additional features and advantages of this type of gear are discussed fully in the previously referred copending application on steering gear.

In Figs. 3 and 4 the manner in which the differential casing and the rear spring suspension system are mounted on the sub rails 18a is shown in detail. The differential casing 55 is shaped to provide ears or lugs 55a to which the lower individual spring mountings or perches 56 are joined, the upper spring perches 56a being mounted directly on the sub rails 18a. The latter are recessed at 18b to take the differential casing hubs 55b, and the casing is secured to the lower flanges of the sub rails by means of bolts 58 extending through said flanges and through the horizontal casing webs or flanges 55c. The individual perches contain the vertically opposed blocks 60 shaped, as viewed in lateral cross section in Fig. 4, to define rectangular openings to take the springs. As viewed in longitudinal section, see Fig. 3, the blocks are seen to be curved from their centers away from the springs in order to permit unrestricted bending of the latter.

Pads 61, of suitable elastic material, for instance rubber, are confined between blocks 60 and the springs, the shape of the pads conforming to that of the curved sides of the blocks. Thus the pads are spaced at 62 from the springs on each side of their central points of contact therewith. It will be apparent that in effect, the springs have substantially pivotal mounting in the various perches and therefore the springs may flex in either direction with freedom. The elements comprising the upper perches 56a are held in place by means of bolts 65 extending through the upper and lower blocks and adjacent the sides of the springs, and through the upper flange 18d of the channel sub rail. Between the pair of perches for each upper spring is a buffer plate 66 having upturned outer ends 66a curved to conform with the shape of the rubber pads 61. The upper buffer plates are clamped to the springs by means of the longitudinally spaced U-bolts 67 extending around the springs and through the buffer plates. For the purpose of illustrating another method of mounting the buffer plates on the springs, we have shown the lower buffers 66b and plates 80 to be held in place on opposite sides of the springs by straight bolts 67a extending centrally through the springs and through the plates. In this construction the central interfitting nibs and recesses in the springs are dispensed with as the bolts prevent relative slippage of the springs leaves. It is seen that lateral bodily movement of the springs is prevented by the buffer plates 66 in that they bear directly against the rubber pads. An advantage is gained by curving the ends of the buffer plate in the manner illustrated in that when the spring is subjected to flexure with a certain resultant amount of vertical movement of the buffer plate, the latter, instead of scraping or binding against the pads, has, by virtue of its shape, a sliding movement thereon such that the pads are subjected to no appreciable wear.

The upper and lower perches are similar except that in the latter, bolts 65a confining the various parts extend through the casing lugs 55a instead of the subrails. The respective pairs of perches for each lower spring are joined by means of plates 70 bearing against the lower perch blocks 60a, the latter being shaped to permit said plate to bear flatly thereagainst, and the plates are secured to the perches by means of bolts 65a. The individual lower spring mountings thus are strengthened by providing the interconnecting plates 70 in that each perch is braced by the other against forces occasioned by extreme flexure of the springs, tending to move or tilt the perches from their seats on the casing lugs.

It will be understood that the blocks 60 and 60a adjacent the subrails and casing lugs may be dispensed with and the pads brought to rest directly on the subrails and lugs, but it is preferred that in order to give the proper curvature to the pads, separate blocks be provided which conform to the shape of the pads and serve as a backing for them. Insofar as the differential mounting itself is concerned, the springs may be of any desired number and arrangement and, in fact, may be mounted entirely separate from the differential. The present construction, however, shows a preferred method for combining the differential and spring mountings in a highly advantageous manner.

As in the case of the forward suspension system, the springs in the rear suspension are terminally and pivotally connected at 71 to the vertical wheel carriers 72, these in turn serving as mountings for the rear wheels 17a and their associated parts. Inasmuch as the differential is mounted directly on the frame members, and since the rear wheels with their carriers are capable of considerable vertical displacement relative to the differential because they are mounted directly on the springs, it follows that the drive between the differential and rear wheels must be such as to permit vertical wheel displacement. Accordingly, drive is transmitted from the differential shaft 74 to the wheel shafts (not shown) by way of the intermediate shafts 75, these in turn being joined to the differential drive shaft and the rear wheel axles by way of universal joints 76 and 76a. Thus it is seen that the drive from the differential to the wheels has sufficient flexibility to permit any vertical displacement of the wheels that may take place.

It is to be noted that it may be desirable to vary the relative positions of the frame side rails 10, the kick-up sills 16 and the sub rails, to accommodate different types of bodies that may be mounted on the chassis. For instance, in the drawings the tops of the sub rails are shown to be somewhat below the upper edges of the side rails in order to provide suitable clearance between the rear springs and the body. In other instances it may be desirable to raise the sub rails and therefore the position of the differential and springs relative to the frame, and to determine the position of the sills accordingly. And various additional modifications and changes in the present preferred embodiment of our invention may be made without departure from the spirit and scope of the appended claims.

We claim:

1. A vehicle chassis of the character described embodying a substantially rectangular frame, supporting members connected directly to the sides of the frame at intermediate longitudinal points thereon and converging toward the rear of the frame, and a differential mounted exclusively on said supporting members.

2. A vehicle chassis of the character described embodying a substantially rectangular frame, a pair of sub rails secured to the sides of the frame at intermediate longitudinal points thereon and converging toward the rear of the frame a predetermined distance, and thence continuing substantially in parallel, and a differential mounted between said sub rails at their parallel extents.

3. A vehicle chassis of the character described embodying a substantially rectangular frame, said frame comprising side rails joined at their rear ends by an end rail, a pair of sills joined to said side rails at their rear end and extending parallel relative thereto, said sills being vertically offset above the side rails and interconnected by a cross member spaced longitudinally of the frame from said end rail, a pair of sub rails secured directly to said side rails at intermediate longitudinal points thereon and extending convergingly to connect with said end rail and thence extending substantially in parallel to said cross member, and a differential mounted on said sub rails at their parallel extents.

4. A spring supported vehicle chassis embodying a substantially rectangular frame, supporting members secured to the sides of the frame at longitudinally intermediate points and extending therebetween toward the rear of the frame, a differential mounted on said supporting members, and a rear spring suspension system embodying a spring extending laterally relative to the frame and mounted on said supporting members.

5. A spring supported vehicle chassis embodying a substantially rectangular frame, supporting members secured directly to the sides of the frame at longitudinally intermediate points and extending between said sides toward the rear of the frame, a differential mounted on said supporting members, and a rear spring suspension system embodying vertically spaced springs extending laterally relative to the frame, the upper and lower frames being mounted on said supporting members and differential respectively, and said supporting members extending between said springs.

6. A spring supported vehicle chassis embodying a substantially rectangular frame, a pair of laterally spaced sub rails secured to the frame and extending longitudinally of the frame between the sides thereof, a differential casing mounted between said sub rails and secured to the underside thereof, and a rear spring suspension system embodying two pairs of vertically spaced and horizontally alined springs extending laterally relative to said frame, the upper and lower pairs of springs being mounted on the upper side of the subrails and on the differential casing respectively.

7. A spring supported vehicle chassis embodying a substantially rectangular frame, a pair of laterally spaced sub rails secured to the frame and extending longitudinally of the frame between the sides thereof, a differential casing mounted between said sub rails and secured to the underside thereof, and a rear spring suspension system embodying vertically spaced springs extending laterally relative to said frame, the upper and lower springs being mounted on the sub rails and differential respectively and being yieldably confined against vertical movement within their mountings.

8. A spring supported vehicle chassis embodying a substantially rectangular frame, a pair of laterally spaced sub rails secured to the frame and extending longitudinally of the frame between the sides thereof, a differential casing mounted between said sub rails and secured to the underside thereof, and a rear spring suspension system embodying vertically spaced springs extending laterally relative to said frame, the upper spring being carried at two longitudinally spaced points therealong by means of perches mounted on each of said sub rails, and the lower spring being similarly carried by spring perches mounted on the differential casing.

9. A spring supported vehicle chassis embodying a substantially rectangular frame, a pair of laterally spaced sub rails secured to the frame and extending longitudinally of the frame between the sides thereof, a differential casing mounted between said sub rails and secured to the underside thereof, and a rear spring suspension system embodying vertically spaced springs extending laterally relative to said frame, the upper and lower springs each being carried in a pair of spaced and axially alined perches mounted on the sub rails and differential casing respectively, each of said perches embodying a pair of vertically opposed pads engaging the springs on its upper and lower surfaces.

10. A spring supported vehicle chassis embodying a substantially rectangular frame, a pair of laterally spaced sub rails secured to the frame and extending longitudinally of the frame between the sides thereof, a differential casing mounted between said sub rails and secured to the underside thereof, and a rear spring suspension system embodying vertically spaced springs extending laterally relative to said frame, the upper and lower springs each being carried in a pair of spaced and axially alined perches mounted on the sub rails and differential casing respectively, each of said perches embodying a pair of vertically opposed blocks spaced from the upper and lower surfaces of the spring, and a pad between each of said blocks and the spring, said blocks in the upper perches being secured to the sub rails and the blocks in the lower perches being joined to the differential casing.

11. A vehicle chassis of the character described embodying a substantially rectangular frame, supporting members connected directly to the sides of the frame at longitudinally intermediate points in said sides, said members extending longitudinally between said sides toward the rear of the frame, and a differential mounted between said supporting members.

In witness that we claim the foregoing we have hereunto subscribed our names this 13th day of December 1928.

OSCAR F. LUNDELIUS.
JOHN R. DILLON.